(12) United States Patent
Ishida et al.

(10) Patent No.: US 6,806,333 B2
(45) Date of Patent: Oct. 19, 2004

(54) AQUEOUS DISPERSION OF FLUOROCOPOLYMER

(75) Inventors: Toru Ishida, Chiba (JP); Naomi Ichikuni, Chiba (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 10/351,440

(22) Filed: Jan. 27, 2003

(65) Prior Publication Data
US 2003/0114616 A1 Jun. 19, 2003

Related U.S. Application Data

(63) Continuation of application No. PCT/JP01/06461, filed on Jul. 26, 2001.

(30) Foreign Application Priority Data
Jul. 27, 2000 (JP) ........................................ 2000-226446

(51) Int. Cl.$^7$ ............................................. C08F 114/18
(52) U.S. Cl. .................... 526/250; 526/318.6; 526/329; 526/329.4; 526/329.6; 526/329.7; 524/458; 525/276
(58) Field of Search ............................. 526/250, 318.6, 526/329, 329.4, 329.6, 329.7; 524/458; 525/276

(56) References Cited

U.S. PATENT DOCUMENTS

| | | | | | |
|---|---|---|---|---|---|
| 5,010,121 | A | * | 4/1991 | Yeates et al. | ................ 523/336 |
| 5,447,982 | A | * | 9/1995 | Kamba et al. | ............... 524/458 |
| 5,882,466 | A | * | 3/1999 | Grootaert et al. | ........... 156/329 |
| 6,153,675 | A | * | 11/2000 | Yamamoto et al. | ........... 524/58 |
| 6,350,806 | B1 | * | 2/2002 | Tsuda et al. | ................. 524/492 |
| 6,610,788 | B1 | * | 8/2003 | Takakura et al. | ........... 525/276 |

FOREIGN PATENT DOCUMENTS

| JP | 8-157684 | | 6/1996 |
|---|---|---|---|
| JP | 9-157314 | | 6/1997 |
| JP | 09-157314 A | * | 6/1997 |
| JP | 2001-164065 | | 6/2001 |

OTHER PUBLICATIONS

International Preliminary Examination Report (PCT/JP01/06461); Sep. 26, 2002.

* cited by examiner

Primary Examiner—David W. Wu
Assistant Examiner—Henry S. Hu
(74) Attorney, Agent, or Firm—Oblon, Spivak, McClelland, Maier & Neustadt, P.C.

(57) ABSTRACT

An aqueous dispersion of a fluorocopolymer, which is excellent in stability and film-forming properties as an aqueous dispersion, and which gives a coating film excellent in mechanical strength and improved in transparency, water resistance and stain resistance. A stable aqueous dispersion of a fluorocopolymer obtained in such a manner that a fluorocopolymer comprising polymerized units based on a vinyl monomer having a reactive group as the base is subjected to a composite treatment or a mixing treatment with a (meth)acrylate containing a reactive group capable of forming a bond by reaction with the above reactive group or the like.

10 Claims, No Drawings

AQUEOUS DISPERSION OF FLUOROCOPOLYMER

TECHNICAL FIELD

The present invention relates to an aqueous dispersion of a fluorocopolymer.

BACKGROUND ART

Heretofore, a vinylidene fluoride type resin is widely used as a baking-type coating material, since it is excellent in weather resistance, heat resistance and chemical resistance and it is soluble in a solvent at a high temperature. As such a vinylidene fluoride type resin, a homopolymer of vinylidene fluoride or a copolymer of vinylidene fluoride with a fluoroolefin (such as tetrafluoroethylene, hexafluoropropylene or chlorotrifluoroethylene), has been proposed.

Further, it is known that a copolymer of a fluoroolefin with cyclohexyl vinyl ether and other various monomers, is soluble in an organic solvent even at room temperature, and when used as a coating material, it gives a coating film which is transparent and has high gloss and which further has excellent characteristics such as high weather resistance, water and oil repellency, stain resistance and non-tackiness (JP-A-55-44083), and its use is increasing in the field of weather resistant coating materials for interior and exterior of e.g. buildings.

On the other hand, in recent years, restriction on use of organic solvents has been increasing from the viewpoint of the environmental protection against e.g. air pollution, and social demand for an aqueous coating material or a powder coating material employing no organic solvent, has increased.

Also with respect to a fluororesin, from such a viewpoint, an aqueous dispersion type has been studied, and with respect to a vinylidene fluoride type resin, a method for emulsion polymerization of an acrylic monomer in the presence of vinylidene fluoride resin particles, has been proposed (JP-A-3-8884, JP-A-4-325509).

Further, also with respect to a copolymer of a fluoroolefin with cyclohexyl vinyl ether and other various monomers, an aqueous dispersion type has been studied, and it has been reported that such can be prepared by emulsion polymerization (JP-A-57-34107, JP-A-61-231044). Further, an aqueous dispersion has been proposed in which a fluorine-containing copolymer having, as an essential constituting component, polymerized units based on a macro monomer having a hydrophilic moiety, is dispersed in water (JP-A-2-225550). This aqueous dispersion is excellent in the film-forming properties and presents a coating film having good mechanical strength, and it is reported further that it can be produced even without using an emulsifier or a hydrophilic organic solvent.

However, with an aqueous dispersion of a vinylidene fluoride type resin, the stability of the aqueous dispersion is not necessarily good, and the transparency of the coating film is poor due to the crystallizability of the resin, and if the crystallizability is lowered in an attempt to improve the transparency, there has been a problem that the glass transition temperature of the coating film tends to be so low that the stain resistance tends to deteriorate. By seed polymerization of an acrylic monomer, there has been some improvement over the problems, but such has not been adequate. Further, there has been a problem also with respect to the film-forming properties.

Furthermore, if the vinylidene fluoride type resin is composed solely of a copolymer with a fluoroolefin, the cost tends to be high. A copolymer of a fluoroolefin with cyclohexyl vinyl ether and other various monomers is practically useful as the transparency of the coating film and the film-forming properties are good, but since a liquid monomer is employed, the coating film tends to be slightly tacky, and a further improvement in this respect, has been desired.

The present inventors have proposed that the above problems can be basically solved by an aqueous dispersion of a composite of a fluorocopolymer comprising a fluoroolefin and ethylene or propylene and a (meth)acrylate type copolymer (such as JP-A-12-128934). However, the compatibility of a fluorocopolymer and a (meth)acrylate type copolymer is not necessarily sufficient, and whitening of a coating film may take place in some cases under a high temperature baking condition at a level of 200° C. depending upon the purpose of use.

The present invention is to solve the above-described problems of the prior art and has an object to present an aqueous dispersion of a fluorocopolymer which is excellent in stability and film-forming properties, and which gives a coating film of the fluorocopolymer excellent in mechanical strength, and having improved weather resistance, water resistance, stain resistance and transparency.

DISCLOSURE OF THE INVENTION

The present invention has been made to solve the above problems, and according to the present invention, the following inventions are presented.

(1) An aqueous dispersion of a fluorocopolymer, which is obtained by emulsion polymerization, in the presence of 100 parts by mass of particles of a fluorocopolymer (A) comprising polymerized units based on (a) a fluoroolefin, polymerized units based on (b) propylene, polymerized units based on (c) ethylene and/or polymerized units based on (d) butylene, and polymerized units based on (e) a vinyl monomer having a reactive group, of from 5 to 200 parts by mass of a radical polymerizable monomer mixture comprising (g) a (meth)acrylic acid capable of forming a bond by reaction with the reactive group of the above (e) and/or (h) an alkyl(meth) acrylate having a carbon number of from 1 to 18 in the alkyl group, and having a reactive group capable of forming a bond by reaction with the reactive group of the above (e).

(2) An aqueous dispersion of a fluorocopolymer, which is obtained by mixing an aqueous dispersion of 100 parts by mass of a fluorocopolymer (A) comprising polymerized units based on (a) a fluoroolefin, polymerized units based on (b) propylene, polymerized units based on (c) ethylene and/or polymerized units based on (d) butylene, and polymerized units based on (e) a vinyl monomer having a reactive group, with an aqueous dispersion of from 5 to 200 parts by mass of a copolymer (B) obtained by emulsion polymerization of a radical polymerizable monomer mixture comprising (g) (meth)acrylic acid capable of forming a bond by reaction with the reactive group of the above (e) and/or (h) an alkyl (meth)acrylate having a carbon number of from 1 to 18 in the alkyl group, and having a reactive group capable of forming a bond by reaction with the reactive group of the above (e).

The aqueous dispersion of a fluorocopolymer of the above (1) is an aqueous dispersion of a fluorocopolymer by a "composite treatment" as described hereinafter, and the aqueous dispersion of the above (2) is an aqueous dispersion of a fluorocopolymer by a "mixing treatment".

BEST MODE FOR CARRYING OUT THE INVENTION

Now, preferred mode for carrying out the invention will be explained in detail.

In the present invention, a fluorocopolymer (A) comprising polymerized units based on (a) a fluoroolefin, polymerized units based on (b) propylene, polymerized units based on (c) ethylene and/or polymerized units based on (d) butylene, and polymerized units based on (e) a vinyl monomer having a reactive group, is used as a copolymer to be the base in a treatment. The copolymer to be the base may further contain polymerized units based on (f) another copolymerizable monomer.

The fluorocopolymer (A) to be the base is preferably composed of the following compositional proportions of the polymerized units based on the following monomers (hereinafter represented by the monomer names). Namely,

| | |
|---|---|
| (a) fluoroolefin | 20 to 80 mol % |
| (b) propylene | 2 to 70 mol % |
| (c) ethylene | (5) to (70) mol % |
| (d) butylene | (5) to (70) mol % |
| (e) vinyl monomer having a reactive group | 0.5 to 20 mol % |
| (f) another copolymerizable monomer | 0 to 50 mol %. |

The compositional proportions are further preferably:

| | |
|---|---|
| (a) fluoroolefin | 35 to 65 mol % |
| (b) propylene | 4 to 55 mol % |
| (c) ethylene | (8) to (60) mol % |
| (d) butylene | (8) to (60) mol % |
| (e) vinyl monomer having a reactive group | 0.5 to 10 mol % |
| (f) another copolymerizable monomer | 0 to 30 mol %. |

Most preferably:

| | |
|---|---|
| (a) fluoroolefin | 40 to 60 mol % |
| (b) propylene | 6 to 35 mol % |
| (c) ethylene | (10) to (35) mol % |
| (d) butylene | (10) to (35) mol % |
| (e) vinyl monomer having a reactive group | 1 to 10 mol % |
| (f) another copolymerizable monomer | 0 to 20 mol %. |

Here, the compositional proportions of the polymerized units (c) ethylene and (d) butylene are bracketed and represented, for example, as (5), (8) and (10), for the following meanings. Namely, as defined in the claims, at least one of (c) and (d) is necessarily contained, and the other may not be contained at all, and (5), (8), (10) or the like represents the content of the component (c) or (d) thus contained alone in such a case. Further, when both (c) and (d) are contained, (5), (8), (10) or the like represents the total content of both components.

When the above fluorocopolymer of the present invention is employed as the base, if the proportion of the polymerized units based on (a) a fluoroolefin is too small, the weather resistance tends to be poor, and if it is too large, the cost tends to be high relative to the improvement in weather resistance, such being undesirable. Taking these into consideration, the above range is selected.

Further, if the proportion of the polymerized units based on (b) propylene is too large, the fluorocopolymer tends to be rubbery, and the hardness of the coating film tends to be inadequate, and if it is too small, the melting point tends to be too high, and the flexibility of the coating film tends to be inadequate. Taking these into consideration, the above range is selected.

As mentioned above, the polymerized units based on (c) ethylene and polymerized units based on (d) butylene may both be used at the same time, or either one may be used. However, it is essential to use at least one of them. If the proportion of (c) and/or (d) is too large, the melting point tends to be too high, and the crystallization of the coating film tends to be high, whereby the transparency tends to decrease. If it is too small, the fluorocopolymer tends to be rubbery, whereby the hardness tends to be inadequate. Taking these into consideration, the above range is selected as preferred.

Further, if the proportion of the polymerized units based on (e) a vinyl monomer having a reactive group is too small, the transparency of the coating film tends to decrease, and if it is too large, the aqueous dispersion tends to be unstable, such being unfavorable. Taking these into consideration, the above range is selected.

Here, as described above, the polymerized units (f) are not essential components, and the fluorocopolymer may basically be used even if they are not contained at all. However, in order to control various physical properties such as a glass transition point, they are preferably contained in some cases depending upon the purpose. In such a case, if their proportion is larger than the above range, the weather resistance of the coating film tends to be poor, such being unfavorable.

In the present invention, the fluoroolefin (a) is preferably a $C_{2-4}$ fluoroolefin containing fluorine atoms, such as trifluoroethylene, chlorotrifluoroethylene, vinylidene fluoride, tetrafluoroethylene, trifluoropropylene, tetrafluoropropylene, pentafluoropropylene, hexafluoropropylene, tetrafluorobutylene or pentafluorobutylene, particularly preferably a perfluoroolefin. Most preferably, it is tetrafluoroethylene. Further, it may contain, in addition to fluorine atoms, other halogen atoms such as chlorine atoms.

Further, as the butylene (d) in the present invention, 1-butylene, 2-butylene and isobutylene may be used. From the viewpoint of easy availability, isobutylene is most preferred. Further, a mixture of them may be employed.

One characteristic of the present invention is that the fluorocopolymer particles (A) to be the base, contain polymerized units based on (e) a vinyl monomer having a reactive group. The vinyl monomer having a reactive group of (e) is preferably one having at least one functional group selected from the group consisting of a carboxyl group, including, but not limited to, a carboxylic acid group, an ester group, a carboxylate salt or an amide group, an epoxy group, a hydrolyzable silyl group, a hydroxyl group and an amino group. A monomer having a carboxyl group may, for example, be a monomer having a carboxyl group, such as an unsaturated fatty acid, including acrylic acid, methacrylic acid, crotonic acid, isocrotonic acid, 10-undecenoic acid, 9-octadecenoic acid (oleic acid), fumaric acid and maleic acid, or a carboxylic acid group-containing monomer represented by the formula (1) or (2),

(wherein each of $R^1$ and $R^3$ is a $C_{2-15}$ bivalent hydrocarbon group, each of $R^2$ and $R^4$ is a saturated or unsaturated linear or cyclic bivalent hydrocarbon group, and M is a hydrogen atom, a hydrocarbon group or an alkali metal; or the carboxyl group may be represented by an amide group).

A monomer containing an epoxy group may, for example, be an epoxy group-containing alkyl vinyl ether such as glycidyl vinyl ether; an epoxy group-containing alkyl allyl ether such as glycidyl allyl ether; or an epoxy group-containing alkyl acrylate or methacrylate such as glycidyl acrylate or glycidyl methacrylate.

A monomer containing a hydrolyzable silyl group may, for example, be a hydrolyzable silyl group-containing ester such as trimethoxy vinyl silane, triethoxy vinyl silane, γ-(meth)acryloyloxypropyltrimethoxysilane, γ-(meth)acryloyloxypropyltriethoxysilane, γ-(meth)acryloyloxypropyltriisopropenyloxysilane or γ-(meth)acryloyloxypropyltriethoxysilane. Polymerized units containing a hydrolyzable silyl group may be introduced by copolymerizing such a monomer containing a hydrolyzable silyl group.

A monomer containing a hydroxyl group may, for example, be 2-hydroxyethyl vinyl ether, 4-hydroxybutyl vinyl ether, 2-hydroxyethyl crotonate, 2-hydroxyethyl allyl ether, allyl alcohol, 2-hydroxyethyl(meth)acrylate, hydroxypropyl (meth)acrylate or 4-hydroxybutyl (meth)acrylate, and a monomer containing an amino group may, for example, be diethylaminoethyl (meth)acrylate or dimethylaminoethyl (meth)acrylate.

The fluorocopolymer of the present invention may be such a copolymer that the fluorocopolymer (A) to be the base may further contain, in addition to the polymerized units based on the above monomers (a) to (e), polymerized units based on (f) another copolymerizable monomer.

The monomer (f) may be at least one monomer selected from the group consisting of a vinyl ester, a vinyl ether, an isopropenyl ether, a (meth)acrylate, a crotonate and an allyl ether. When the polymerized units based on said monomer are contained, the glass transition point may easily be controlled, affinity to a coating material additive such as a curing agent may be improved, or the hardness of the coating film or the gloss value may be improved in some cases, and accordingly they are necessary in some cases depending upon the purpose of use. Here, if the amount of the polymerized units based on (f) a copolymerizable monomer is too large, the coating film tends to be tacky.

Accordingly, the most preferred content of the polymerized units based on the component (f) is from 0 to 20 mol % as described above.

The above vinyl ester may, for example, be vinyl acetate, vinyl propionate, vinyl butyrate, vinyl pivalate, vinyl caproate, vinyl caprylate or vinyl stearate. Further, the vinyl ether may, for example, be methyl vinyl ether, ethyl vinyl ether, propyl vinyl ether, butyl vinyl ether or cyclohexyl vinyl ether. The isopropenyl ether may, for example, be methyl isopropenyl ether, ethyl isopropenyl ether, propyl isopropenyl ether, butyl isopropenyl ether or cyclohexyl isopropenyl ether.

Here, the (meth)acrylate may, for example, be methyl (meth)acrylate, ethyl (meth)acrylate, propyl (meth)acrylate, n-butyl (meth)acrylate, isobutyl (meth)acrylate, t-butyl (meth)acrylate, n-amyl (meth)acrylate, isoamyl (meth)acrylate, n-hexyl (meth)acrylate, isohexyl (meth)acrylate, 2-ethylhexyl (meth)acrylate or lauryl (meth)acrylate.

The crotonate may, for example, be methyl crotonate, methyl isocrotonate, ethyl crotonate, ethyl isocrotonate, propyl crotonate, isopropyl crotonate, isobutyl crotonate, t-butyl crotonate, n-hexyl crotonate or isohexyl crotonate. Further, the allyl ether may, for example, be ethyl allyl ether, propyl allyl ether, butyl allyl ether or isobutyl allyl ether.

For the aqueous dispersion of the present invention, the above fluorocopolymer (A) to be the base is subjected to (i) composite treatment or (ii) mixing treatment by e.g. a (meth)acrylate having a reactive group capable of forming a bond by reaction with the reactive group of (e).

Here, (i) "composite treatment" is emulsion polymerization of a monomer mixture comprising a (meth)acrylate having a reactive group or the like as the main component in the presence of particles of the fluorocopolymer (A) to be the base. Namely, by an acryl seed polymerization employing said particles as seed particles, an aqueous dispersion of fluorine type/(meth)acrylate type composite particles is obtained. In the present invention, reactive groups capable of mutually bonding to each other are contained in the respective copolymers, and accordingly a part of or the entire copolymers are bonded at the time of emulsion polymerization, and the phase separation is suppressed. Accordingly, with respect to the morphology of the above composite particles, the copolymers may be in a so-called core-shell type, may undergo microphase separation or may be compatibilized in the particles, depending upon compatibility or the degree of bonding of the fluorine type copolymer/(meth)acrylate type copolymer. The influence of the difference in the morphology over physical properties of the coating film obtained from said aqueous dispersion is not completely clear, but it is considered that the phase separation is suppressed since a bond is formed in each morphology.

Further, with respect to the coating film formed by using the above aqueous dispersion as a coating material binder, it is considered that reactive groups in both copolymers are further bonded and the copolymers are strongly fused when the coating film is heated and the aqueous solvent is removed by drying. Accordingly, it is considered that transparency, mechanical strength, etc. of the coating film can further be improved while maintaining characteristics such as weather resistance of the fluorocopolymer to be the base, as compared with a coating film obtained from an aqueous dispersion of fluorine type/(meth)acrylate type particles which form no bond at all.

On the other hand, (ii) "mixing treatment" is such a treatment that a monomer mixture comprising a (meth)acrylate having a reactive group or the like as the main component is subjected to emulsion polymerization to prepare an aqueous dispersion of a (meth)acrylate type copolymer (B), and the aqueous dispersion is added to the aqueous dispersion of the above fluorocopolymer (A) to be the base, followed by well mixing, to obtain an aqueous dispersion of a fluorocopolymer wherein particles of the fluorocopolymer (A) to be the base and particles of the (meth)acrylate type copolymer (B) are uniformly dispersed and mixed.

With respect to the coating film formed by using the aqueous dispersion of the present invention obtained by the above mixing treatment as a coating material binder, it is considered that reactive groups in both copolymers are bonded and the copolymers are strongly fused when the coating film is heated and the aqueous solvent is removed by drying. Accordingly, the obtained coating film is considered to be such that the phase separation is prevented, it is excellent in transparency, and its transparency, mechanical strength, etc. can further be improved while keeping characteristics such as weather resistance of the fluorocopolymer.

This is evident from such a fact that in the present invention, a bond which inhibits the phase separation is formed in a heating process, whereby transparency is maintained, whereas in a case where no reactive groups are introduced in the fluorocopolymer and the (meth)acrylate type copolymer, and thus no bond is formed, a coating film obtained from an aqueous dispersion thereof undergoes phase separation and whitening when heated to at least 200° C. for example. In view of transparency, a composite treatment is most preferred.

In the present invention, the (meth)acrylate or the like, used for the composite treatment or the mixing treatment is a radical polymerizable monomer mixture containing (g) (meth)acrylic acid capable of forming a bond by reaction with the reactive group of the above (e) and/or (h) an alkyl (meth)acrylate having a carbon number of from 1 to 18 in the alkyl group, and having a reactive group capable of forming a bond by reaction with the reactive group of the above (e).

The (h) alkyl (meth)acrylate having a reactive group, other than (meth)acrylic acid is one having a carbon number of from 1 to 18 in the alkyl group, and the reactive group is selected from the group consisting of a carboxyl group, an epoxy group, a hydrolyzable silyl group, a hydroxyl group and an amino group. One containing a carboxyl group may be an ester of an oxycarboxylic acid (for example, 2-hydroxypentanoic acid) with (meth)acrylic acid such as 2-carboxylethyl (meth)acrylate, one containing an epoxy group may be glycidyl (meth)acrylate, one containing a hydrolyzable silyl group may, for example, be γ-(meth)acryloyltrimethoxysilane, γ-(meth)acryloyltriethoxysilane, γ-(meth)acryloyloxypropyltrimethoxysilane, γ-(meth)acryloyloxypropyltriethoxysilane, γ-(meth)acryloyloxypropylmethyldimethoxysilane or γ-(meth)acryloyloxypropyltriisopropenyloxysilane, one containing a hydroxyl group may, for example, be 2-hydroxyethyl (meth)acrylate, hydroxypropyl (meth)acrylate or 4-hydroxybutyl (meth)acrylate, and one containing an amino group may, for example, be diethylaminoethyl (meth)acrylate or dimethylamino ethyl (meth)acrylate.

The combination with (e) the reactive group in the fluorocopolymer (A) to be the base may be any combination in which a bond is formed, and for example, preferred is an epoxy group, a hydroxyl group or an amino group for a carboxyl group, or a hydrolyzable silyl group for a hydrolyzable silyl group. The equivalent ratio of (e) the reactive group in the fluorocopolymer (A) to (h) the reactive group in the (meth)acrylate type copolymer is from 1:2 to 2:1, particularly preferably almost 1:1, whereby a highest effect of improving the transparency will be obtained.

Further, in the present invention, in addition to (g) (meth)acrylic acid and/or (h) a (meth)acrylate having the above reactive group, a monomer copolymerizable therewith may be copolymerized. In such a case, the proportion of said copolymerizable monomer in the entire monomer mixture is from 30 mol to 99 mol %, preferably from 50 mol to 95%. If the amount of said copolymerizable monomer is smaller than this, the aqueous dispersion tends to be unstable, and if it is too large, transparency of the coating film tends to be impaired.

Such a monomer copolymerizable with (g) (meth)acrylic acid and/or (h) a (meth)acrylate having the above reactive group, is preferably a (meth)acrylate having a carbon number of from 1 to 18 in the alkyl group, and it may, for example, be methyl (meth)acrylate, ethyl (meth)acrylate, propyl (meth)acrylate, n-butyl (meth)acrylate, isobutyl (meth)acrylate, t-butyl (meth)acrylate, n-amyl (meth)acrylate, isoamyl (meth)acrylate, n-hexyl (meth)acrylate, isohexyl (meth)acrylate, 2-ethylhexyl (meth)acrylate, cyclohexyl (meth)acrylate or lauryl (meth)acrylate. Among them, particularly preferred is a (meth)acrylate having a $C_{1-6}$ alkyl group.

The amount of the copolymer comprising (g) (meth)acrylic acid and/or (h) a (meth)acrylate having the above reactive group is from 5 to 200 parts by mass, preferably from 10 to 100 parts by mass, more preferably from 20 to 50 parts by mass, per 100 parts by mass of the fluorocopolymer (A) to be the base. Accordingly, in a case where the above composite treatment is carried out, for example, a monomer comprising from 5 to 200 parts by mass of (meth)acrylic acid and/or a (meth)acrylate having a reactive group is charged in a reactor in the presence of 100 parts by mass of the fluorocopolymer (A) to carry out emulsion polymerization. Further, in the case of the mixing treatment, for example, an aqueous dispersion of from 5 to 200 parts by mass of a copolymer (B) obtained by emulsion polymerization of a monomer comprising (meth)acrylic acid and/or a (meth)acrylate having a reactive group and an aqueous dispersion of 100 parts by mass of the fluorocopolymer (A) is mixed.

In the above case, conditions for the emulsion polymerization of the copolymer (B) comprising (g) (meth)acrylic acid and/or (h) a (meth)acrylate having a reactive group and the process for producing an aqueous dispersion of the copolymer are in accordance with conditions for emulsion polymerization regarding the fluorocopolymer as described hereinafter.

The minimum film-forming temperature (MFT) of the aqueous dispersion comprising said fluorocopolymer and the copolymer comprising (meth)acrylic acid and/or a (meth)acrylate having a reactive group, obtained by the composite treatment or the mixing treatment, is preferably from 0 to 80° C., more preferably from 20 to 70° C. If the MFT is too low, the coating film tends to be tacky, and if the MFT is too high, drying property in winter tends to be poor.

The aqueous dispersion of the present invention comprises particles of the fluorocopolymer stably dispersed in water by an emulsifier. As the emulsifier, a nonionic emulsifier or an anionic emulsifier may be used alone or in combination. The nonionic emulsifier may, for example, be an alkylphenol ethylene oxide adduct, a higher alcohol ethylene oxide adduct, or a block copolymer of ethylene oxide with propylene oxide. The anionic emulsifier may, for example, be an alkyl benzene sulfonate, an alkyl naphthalene sulfonate, a higher fatty acid salt, an alkylsulfonic acid ester salt, an alkyl ether sulfonic acid ester salt or a phosphoric acid ester salt.

Further, such an emulsifier is used basically by adding it to a charged monomer at the time of emulsion polymerization, but an emulsifier of the same type as and/or an emulsifier of a different type from one used during polymerization may be added to the aqueous dispersion after the emulsion polymerization.

Here, as the emulsifier to be added to the aqueous dispersion after the polymerization, in addition to the above emulsifiers, an alkali metal salt of a dialkyl sulfosuccinic acid such as sodium dioctyl sulfosuccinate or sodium dinonyl sulfosuccinate, and a combination thereof with an alkylene glycol such as ethylene glycol or propylene glycol, may, for example, be mentioned. When such an alkali metal salt of a dialkyl sulfosuccinic acid and an alkylene glycol are added, the mechanical stability and the thermal stability of the above aqueous dispersion can be improved.

In the present invention, in the emulsion polymerization to obtain the fluorocopolymer (A) to be the base and the emulsion polymerization of the (meth)acrylate or the like in the composite treatment or the mixing treatment, initiation of the emulsion polymerization is carried out by addition of a polymerization initiator in the same manner as the initiation of usual emulsion polymerization. As the polymerization initiator, a usual radical initiator may be employed, but a water-soluble initiator is particularly preferably employed. Specifically, a persulfate such as ammonium persulfate, hydrogen peroxide, or a redox initiator composed of a combination thereof with a reducing agent such as sodium hydrogen sulfite or sodium thiosulfate, an inorganic initiator of a system having a small amount of iron, a ferrous salt, silver sulfate or the like incorporated thereto, or an organic initiator such as a dibasic acid peroxide such as disuccinic acid peroxide or diglutaric acid peroxide, azobisisobutylamidine hydrochloride or azobisisobutyronitrile, may, for example, be mentioned.

The amount of the polymerization initiator can be changed optionally depending upon the type and the emulsion polymerization conditions, but it is usually at a level of from 0.005 to 0.5 part by mass, per 100 parts by mass of the monomer to be subjected to emulsion polymerization. Further, such a polymerization initiator may be added all at once or dividedly as the case requires.

Further, a pH controlling agent may be used for the purpose of increasing the pH of the emulsion. As such a pH controlling agent, an inorganic base such as sodium carbonate, potassium carbonate, sodium hydrogen orthophosphate, sodium thiosulfate or sodium tetraborate, or an organic base such as triethylamine, triethanolamine, dimethylethanolamine or diethylethanolamine, may, for example, be mentioned.

The amount of the pH controlling agent is usually at a level of from 0.05 to 2 parts by mass, preferably from 0.1 to 2 parts by mass, per 100 parts by mass of the emulsion polymerization medium. The higher the pH is, the higher the polymerization rate tends to be.

Further, with respect to the initiation temperature for the emulsion polymerization, an optimum value is suitably selected depending upon the type of the polymerization initiator. However, usually, a temperature of from 0 to 100° C., particularly from about 10 to about 70° C., is preferably employed. The polymerization temperature is from about 20 to about 120° C., particularly from about 30 to about 70° C. Further, the reaction pressure can be optionally selected, but usually, it is preferred to employ a pressure of from 0.1 to 10 MPa, particularly from about 0.2 to about 5 MPa.

The emulsion polymerization operation in the present invention is carried out preferably in a reactor of a stirring tank type equipped with a stirrer, an apparatus to supply reaction materials such as a monomer, a heating/cooling apparatus, a temperature/pressure control apparatus, etc. In such a case, the additives such as the monomer, water, the emulsifier and the polymerization initiator may be charged all at once to the reactor. However, for the purpose of improving various physical properties such as the stability of the dispersion and the gloss of the coating film by reducing the particle size of dispersed particles, preliminary emulsifying may be carried out by means of an emulsion stirrer apparatus such as a homogenizer, having an ultra-atomizing property and capable of preparing a microemulsion, prior to addition of the polymerization initiator, and then the initiator is added for polymerization. Further, various methods may be employed, such as a method of introducing the monomer in its entire amount all at once into the reactor, a method of introducing the entire amount of the monomer continuously, a method of introducing the monomer by dividing its entire amount, and a method of charging a part of the monomer for preliminary reaction and then introducing the rest dividedly or continuously. Further, in the case of divided addition, the monomer composition may be different.

Further, in a case where a gaseous monomer such as tetrafluoroethylene, ethylene or propylene is introduced into a reactor and is reacted with the (meth)acrylate or the like in the aqueous dispersion charged in the container, the gaseous monomer is required to be once dissolved in said aqueous dispersion. In order to further improve the absorption of the gas of the monomer into the aqueous solvent, a hydrophilic organic compound, such as an alcohol such as methanol, ethanol, isopropanol, n-butanol, isobutanol or t-butanol; or an alkylene glycol such as ethylene glycol or propylene glycol, may be added to said solvent at the time of polymerization. In this case, the amount of addition is preferably from 0.1 to 10 mass %, based on water of the aqueous solvent. More preferably, it is from 1 to 5 mass %.

If the amount of addition is smaller than this, the gas absorption effect tends to be small, and if it is too large, the content of a volatile organic compound tends to be large, such being unfavorable in view of environmental protection.

With respect to an apparatus for carrying out the mixing treatment, into a container equipped with a general stirrer, an aqueous dispersion of the fluorocopolymer (A) to be the base and an aqueous dispersion of the (meth)acrylate type copolymer having a reactive group are introduced and they are mixed with stirring. Further, it is also possible to use a reactor used for the emulsion polymerization as the container for carrying out the mixing. Further, in order that both are more sufficiently uniformly dispersed, the mixing may be carried out by the above apparatus of a homogenizer type.

The aqueous dispersion of the present invention may be useful as a water-based coating material as it is, as a coating material binder. However, additives which are usually added to water-based coating materials, such as a coloring agent, a plasticizer, an ultraviolet absorber, a leveling agent, a defoaming agent, a pigment dispersing agent, a film-forming co-agent, a thickener, a cissing-preventive agent, an anti-skinning agent and a curing agent, may be incorporated as the case requires. Further, a metallic pigment such as an aluminum paste may be used. As the coloring agent, a dye, an organic pigment or an inorganic pigment may, for example, be mentioned. As the plasticizer, a conventional one, for example, a low molecular weight plasticizer such as dioctylphthalate, or a high molecular weight plasticizer such as a vinyl polymer plasticizer or a polyester type plasticizer, may, for example, be mentioned. As the film-forming co-agent, a polyhydric alcohol monoalkyl ether such as dipropylene glycol-n-butyl ether, ethylene glycol monoethyl ether, ethylene glycol monobutyl ether or diethylene glycol monobutyl ether, or an organic acid ester, may, for example, be used. Further, as the curing agent, a polyisocyanate of self-emulsifiable type comprising as a skeleton e.g. a polyhydric isocyanate such as hexamethylene diisocyanate, tolylene diisocyanate, xylene diisocyanate, isophorone diisocyanate, diphenylmethane diisocyanate, hydrogenated tolylene diisocyanate, hydrogenated xylene diisocyanate or hydrogenated diphenylmethane diisocyanate, and having a hydrophilic group such as an oxyethylene group, may, for example, be used. For example, Bayhydul TPLS-2032 having an oxyethylene group, manufactured by SUMITOMO BAYER URETHANE CO., LTD., and DC-3900, DC-3901 and DC-3712 manufactured by NIPPON POLYURETHANE INDUSTRY CO., LTD., etc. correspond thereto.

Further, in order to improve the stability of the aqueous dispersion, a pH controlling agent may be added thereto. Such a pH controlling agent may, for example, be an inorganic salt such as sodium carbonate, potassium carbonate, o-sodium hydrogenphosphate, sodium thiosulfate or sodium tetraborate, an organic base such as triethylamine or triethanolamine, or ammonia.

EXAMPLES

The present invention will be described in detail with reference to the following Preparation Examples and Examples. However, the present invention is by no means restricted by such Examples. Further, in the following Examples, parts means parts by mass unless otherwise specified.

Preparation Example 1

(1) Into a stainless steel autoclave having an internal capacity of 2.5 l and equipped with a stirrer, 860 g of deionized water, 35 g of (e) 10-undeccenoic acid, 4.75 g of a fluorine type anionic emulsifier (FC-143, manufactured by Sumitomo 3M Company), 2.2 g of a nonionic emulsifier (N-1110, manufactured by Nippon Nyukazai K.K.) and 46.6 g of t-butanol were charged, and deaeration by a vacuum pump and pressurizing with a nitrogen gas were repeated to remove air.

Then, 72 g of (a) tetrafluoroethylene, 1.1 g of (b) propylene and 1.4 g of (c) ethylene were introduced into the autoclave.

When the internal temperature of the autoclave reached 70° C., the pressure was 1.34 MPa. Then, 2 ml of an aqueous solution containing 25% of ammonium persulfate was added to initiate the reaction. While maintaining the pressure by pressurizing as the pressure decreased, 550.5 g of a gas mixture comprising 50 mol % of (a) tetrafluoroethylene, 25 mol % of (b) propylene and 25 mol % of (c) ethylene, was continuously added to continue the reaction. Further, during the progress of the reaction, 30 ml of an aqueous solution containing 25% of ammonium persulfate was continuously added.

(2) 8 hours later, supply of the gas mixture was stopped, and the autoclave was cooled with water to room temperature, whereupon an unreacted monomer was purged, and the autoclave was opened to obtain an aqueous dispersion having a solid content concentration of 40.1 mass %. As a result of the analysis of the composition by $^{13}$C-NMR, this copolymer contained in the dispersion was found to comprise 52 mol % of polymerized units based on (a) tetrafluoroethylene, 26 mol % of polymerized units based on (b) propylene, 19 mol % of polymerized units based on (c) ethylene, and 3 mol % of polymerized units based on (e) 10-undeccenoic acid.

Preparation Example 2

(1) Into a stainless steel autoclave having an internal capacity of 2.5 l and equipped with a stirrer, 850 g of deionized water, 49 g of (e) acrylic acid, 2.2 g of potassium carbonate (K$_2$CO$_3$), 2.2 g of a nonionic emulsifier (N-1110, manufactured by Nippon Nyukazai K.K.), 1.1 g of an anionic emulsifier (sodium lauryl sulfate), and 46.6 g of t-butanol were charged, and deaeration by a vacuum pump and pressurizing with a nitrogen gas were repeated to remove air.

Then, 188 g of (a) tetrafluoroethylene, 9.9 g of (b) propylene and 6.6 g of (c) ethylene were introduced into the autoclave.

When the internal temperature of the autoclave reached 70° C., the pressure was 1.54 MPa. Then, 2 ml of an aqueous solution containing 25% of ammonium persulfate was added to initiate the reaction. While maintaining the pressure as the pressure decreased, 530 g of a gas mixture comprising 50 mol % of (a) tetrafluoroethylene, 40 mol % of (b) propylene and 10 mol % of (c) ethylene, was continuously added to continue the reaction. Further, during the progress of the reaction, 30 ml of an aqueous solution containing 25% of ammonium persulfate was continuously added.

(2) 10 hours later, supply of the gas mixture was stopped, and the autoclave was cooled with water to room temperature, whereupon an unreacted monomer was purged, and the autoclave was opened to obtain an aqueous dispersion having a concentration of 39.5 mass %. As a result of the analysis of the composition by $^{13}$C-NMR, this copolymer contained in the dispersion was found to comprise 52 mol % of polymerized units based on (a) tetrafluoroethylene, 36 mol % of polymerized units based on (b) propylene, 9 mol % of polymerized units based on (e) ethylene, and 3 mol % of polymerized units based on (e) acrylic acid.

Preparation Example 3

Into a glass flask having an internal capacity of 200 ml and equipped with a thermometer, a stirrer and a reflux condenser, 70 g of the aqueous dispersion prepared in Preparation Example 1 (the amount of the fluorocopolymer in the dispersion was 28.1 g) was charged, and heated to 80° C. When the temperature reached 80° C., an aqueous dispersion comprising 1.2 g of (h) glycidyl methacrylate and 10 g of methyl methacrylate, 0.04 g of a nonionic emulsifier (N-1110, manufactured by NIPPON NYUKAZAI CO., LTD.) and 0.02 g of an anionic emulsifier (sodium lauryl sulfate) emulsified with a 1 mass % aqueous solution, was dropped thereon over a period of 1 hour. Immediately after the dropping, 1 ml of an aqueous solution containing 2 mass % of ammonium persulfate was added to initiate the reaction to carry out a composite treatment. 3 hours after the initiation of the reaction, the internal temperature of the flask was increased to 90° C., the reaction was carried out further for 1 hour and the polymerization was completed to obtain an aqueous dispersion 1 of a fluorocopolymer comprising a fluorocopolymer and a methacrylate type copolymer in a mass ratio of 71:29 and having a solid content concentration of 40.8 mass %.

Preparation Example 4

Into a glass flask having an internal capacity of 200 ml and equipped with a thermometer, a stirrer and a reflux condenser, 70 g of the aqueous dispersion prepared in Preparation Example 2 (the amount of the fluorocopolymer in the dispersion was 27.6 g) was charged, and heated to 80° C. When the temperature reached 80° C., an aqueous dispersion comprising 1.2 g of (h) glycidyl methacrylate and 10 g of methyl methacrylate, 0.04 g of a nonionic emulsifier (N-1110, manufactured by NIPPON NYUKAZAI CO., LTD.) and 0.02 g of an anionic emulsifier (sodium lauryl sulfate) emulsified with a 1 mass % aqueous solution, was dropped thereon over a period of 1 hour. Immediately after the dropping, 1 ml of an aqueous solution containing 2 mass % of ammonium persulfate was added to initiate the reaction to carry out a composite treatment. 3 hours after the initiation of the reaction, the internal temperature of the flask was increased to 90° C. and reaction was carried out further for 1 hour and the polymerization was completed to obtain an aqueous dispersion 2 of a fluorocopolymer comprising a fluorocopolymer and a methacrylate type copolymer in a mass ratio of 70:30 and having a solid content concentration of 40.4 mass %.

Preparation Example 5

First, an aqueous dispersion of a methacrylate type copolymer for the mixing treatment was prepared. Into a glass flask having an internal capacity of 300 ml and equipped with a thermometer, a stirrer and a reflux condenser, 150 ml of deionized water, 0.04 g of a nonionic emulsifier (N-1110, manufactured by NIPPON NYUKAZAI CO., LTD.) and 0.02 g of an anionic emulsifier (sodium lauryl sulfate) were charged, and heated to 80° C. When the temperature reached 80° C., a mixed liquid of 15 g of (h) glycidyl methacrylate and 135 g of methyl methacrylate was dropped thereon over a period of 1 hour. Immediately after the dropping, 3 ml of an aqueous solution containing 2 mass % of ammonium persulfate was added thereto to initiate the reaction. 3 hours after the initiation of the reaction, the internal temperature of the flask was increased to 90° C. and reaction was carried out further for 1 hour and the polymerization was completed to obtain an aqueous dispersion of (B) a methacrylate type copolymer.

With 30 g of this aqueous dispersion (containing 15 g of the methacrylate type copolymer), 70 g of the aqueous dispersion obtained in Preparation Example 1 (containing 27.6 g of the fluorocopolymer) was mixed to obtain an aimed aqueous dispersion 3 of the aimed fluorocopolymer.

Preparation Example 6

Into a glass flask having an internal capacity of 200 ml and equipped with a thermometer, a stirrer and a reflux condenser, 70 g of the aqueous dispersion prepared in Preparation Example 1 (the amount of the fluorocopolymer in the dispersion was 28.1 g) was charged, and heated to 80° C. When the temperature reached 80° C., an aqueous dispersion comprising 10 g of methyl methacrylate, 1.2 g of n-butyl methacrylate, 0.04 g of a nonionic emulsifier (N-1110, manufactured by NIPPON NYUKAZAI CO., LTD.) and 0.02 g of an anionic emulsifier (sodium lauryl sulfate) emulsified with a 1 mass % aqueous solution, was dropped thereon over a period of 1 hour. Immediately after the dropping, 1 ml of an aqueous solution containing 2 mass % of ammonium persulfate was added to initiate the reaction. 3 hours after the initiation of the reaction, the internal temperature of the flask was increased to 90° C. and reaction was carried out further for 1 hour and the polymerization was completed to obtain an aqueous dispersion 4 of a fluorocopolymer comprising a fluorocopolymer and a methacrylate type copolymer in a mass ratio of 71:29 and having a solid content concentration of 40.8 mass %.

Examples 1 to 3 and Comparative Example 1

(1) A clear coating material was formulated using 71 g of each of the aqueous dispersions 1 to 4 of a fluorocopolymer obtained in the above Preparation Examples 3 to 6, 5.4 g of a film-forming co-agent, 0.3 g of a thickener, 0.8 g of a dispersant, 0.6 g of a defoaming agent and 10.3 g of deionized water. The film-forming co-agent was Cs-12 (manufactured by Chisso Company), the thickener was Rheobis CR (manufactured by Hoechst Gosei K.K.), the dispersant was Noscospas 44-C (manufactured by Sun-Nopco Company), and the defoaming agent was FS Antifoam 90 (manufactured by Dow Corning Company).

(2) Such a clear coating material was coated on an aluminum plate by an air spray so that the dried film thickness would be 40 μm and dried at 80° C. for 30 minutes to obtain a test specimen. With respect to such a test specimen, tests on transparency, weather resistance, water resistance and stain resistance were carried out.

The evaluation methods were as follows.

Transparency: The test specimen was heated at 200° C. for 10 minutes, and one which was completely transparent by visual observation was identified with symbol ○, one which became slightly clouded was identified with symbol Δ, and one which became remarkably clouded was identified with symbol X.

Evaluation of the weather resistance: After 3,000 hours of the QUV test employing a fluorescent ultraviolet ray weather resistance tester manufactured by Q Panel Company, one having the gloss remarkably deteriorated was identified with symbol X, and one having no substantial deterioration of gloss observed, was identified with symbol ○.

Evaluation of the water resistance: After immersion in warm water of 60° C. for one week, one having peeling of the coating film observed was identified with symbol X, one having no peeling observed but blistering observed was identified with symbol Δ, and one having no abnormality observed was identified with symbol ○.

Stain resistance: Exposure was carried out outdoors at an angle of 45° facing south for one year, whereupon one wherein the color difference after wiping water from the stored plate was less than 5, was identified with symbol ○, one wherein the color difference was from 5 to 10 was identified with symbol Δ, and one wherein the color difference exceeded 10, was identified with symbol X.

Mechanical strength: The mechanical strength of the coating film obtained by using the above clear coating material was evaluated as follows. Namely, the above clear coating material was coated on a glass plate by an air spray so that the dried film thickness would be 40 μm and dried at 80° C. for 30 minutes, and then the resulting coating film was peeled off from the glass plate. The tensile yield elongation (unit: %) and the tensile yield strength (unit: MPa) of the film were measured in accordance with JIS K7127. High values indicate excellent follow-up properties to expansion and contraction of the substrate and resistance against breakage of the substrate, respectively.

The results are shown in Table 1.

TABLE 1

|  | Ex. 1 | Ex. 2 | Ex. 3 | Comp. Ex. 1 |
|---|---|---|---|---|
| Aqueous dispersion | Aqueous dispersion 1 | Aqueous dispersion 2 | Aqueous dispersion 3 | Aqueous dispersion 4 |
| Transparency | ○ | ○ | ○ | X |
| Weather resistance | ○ | ○ | ○ | ○ |
| Water resistance | ○ | ○ | ○ | ○ |
| Stain resistance | ○ | ○ | ○ | Δ |
| Tensile yield elongation | 235 | 221 | 234 | 125 |
| Tensile yield strength | 6.6 | 7.8 | 6.4 | 2.4 |

INDUSTRIAL APPLICABILITY

The aqueous dispersion of a fluorocopolymer of the present invention gives a coating film excellent in mechanical strength, transparency, weather resistance, stain resistance and water resistance, and thus is very useful as a material for weather resistant water-based coating material.

Further, the water-based coating material employing the aqueous dispersion of a fluorocopolymer of the present invention employs a stable aqueous dispersion as the base, basically without use of an organic solvent, and accordingly, it is applicable to the wide range of applications without restrictions such as solvent regulation. For example, it is particularly useful for weather resistant coating of an exterior inorganic building material such as glass, metal or cement.

The entire disclosure of Japanese Patent Application No. 2000-226446 filed on Jul. 27, 2000 including specification, claims and summary is incorporated herein by reference in its entirety.

What is claimed is:

1. An aqueous dispersion of a fluorocopolymer, which is obtained by emulsion polymerization, in the presence of 100 parts by mass of particles of a fluorocopolymer (A), comprising repeating units based on a fluoroolefin (a), propylene (b), ethylene (c), a vinyl monomer (e) having a reactive group, and optionally butylene (d),
    of 5 to 200 parts by mass of one or more radical polymerizable monomers, comprising a (meth)acrylate (h), having a reactive group capable of forming a bond by reaction with the reactive group of the above (e) and
    wherein the equivalent ratio of (e) to (h) is from 1:2 to 2:1.

2. The aqueous dispersion according to claim 1, wherein the reactive groups in (e) and (h) independently comprise at least one functional group selected from the group consisting of a carboxyl group, an epoxy group, a hydrolyzable silyl group, a hydroxyl group and an amino group.

3. The aqueous dispersion according to claim 1, wherein the fluorocopolymer (A) further comprises repeating units based on another copolymerizable monomer (f).

4. The aqueous dispersion according to claim 3, wherein the copolymerizable monomer (f) is selected from the group consisting of a vinyl ester, a vinyl ether, an isopropenyl ether, a (meth)acrylate, a crotonate and an allyl ether.

5. The aqueous dispersion according to claim 1, wherein the emulsion polymerization further comprises (meth) acrylic acid.

6. An aqueous dispersion of a fluorocopolymer, which is obtained by mixing an aqueous dispersion of 100 parts by mass of a fluorocopolymer (A), comprising repeating units based on a fluoroolefin (a), propylene (b), ethylene (c), a vinyl monomer (e) having a reactive group, and optionally butylene (d),
    with an aqueous dispersion of 5 to 200 parts by mass of a copolymer (B), obtained by emulsion polymerization of one or more radical polymerizable monomers, comprising a (meth)acrylate (h), having a reactive group capable of forming a bond by reaction with the reactive group of the above (e), and
    wherein the equivalent ratio of (e) to (h) is from 1:2 to 2:1.

7. The aqueous dispersion according to claim 6, wherein the reactive groups in (e) and (h) independently comprise at least one functional group selected from the group consisting of a carboxyl group, an epoxy group, a hydrolyzable silyl group, a hydroxyl group and an amino group.

8. The aqueous dispersion according to claim 6, wherein the fluoropolymer (A) further comprises repeating units based on another copolymerizable monomer (f).

9. The aqueous dispersion according to claim 8, wherein the copolymerizable monomer (f) is selected from the group consisting of a vinyl ester, a vinyl ether, an isopropenyl ether, a (meth)acrylate, a crotonate and an allyl ether.

10. The aqueous dispersion according to claim 6, wherein the emulsion polymerization further comprises (meth) acrylic acid.

* * * * *